US006913318B2

(12) United States Patent
Higley et al.

(10) Patent No.: US 6,913,318 B2
(45) Date of Patent: Jul. 5, 2005

(54) ADJUSTABLE SEAT SUPPORT FOR A WHEELCHAIR

(75) Inventors: Melvin Scott Higley, Dallas, PA (US); Walter A. Watkins, Courtdale, PA (US); Gerald White, Hunlock Creek, PA (US); Michael J. Rozaieski, Drums, PA (US); Thomas M. Hale, Landisville, PA (US)

(73) Assignee: Pride Mobility Products Corporation, Exeter, PA (US)

(*) Notice: Subject to any disclaimer, the term of this patent is extended or adjusted under 35 U.S.C. 154(b) by 0 days.

(21) Appl. No.: 10/420,651

(22) Filed: Apr. 21, 2003

(65) Prior Publication Data

US 2004/0104614 A1 Jun. 3, 2004

Related U.S. Application Data

(60) Provisional application No. 60/430,582, filed on Dec. 3, 2002.

(51) Int. Cl.[7] .................................................. B60N 2/02

(52) U.S. Cl. ............. 297/383; 297/440.15; 297/440.22; 297/452.4; 297/DIG. 4

(58) Field of Search ......................... 297/440.1, 440.22, 297/452.18, 383, 232, 423.2, DIG. 4

(56) References Cited

U.S. PATENT DOCUMENTS 1,684,062 A * 9/1928 Eberle et al. .......... 297/452.29
1,706,794 A * 3/1929 Linebarger et al. ..... 297/230.14
1,966,343 A * 7/1934 Hallowell et al. .......... 297/327
2,784,769 A 3/1957 Fisher
4,229,039 A * 10/1980 Day ........................... 297/232
4,728,150 A 3/1988 Gaudreau, Jr.
4,763,952 A 8/1988 Gaudreau, Jr.
4,989,890 A 2/1991 Lockard et al.
5,035,467 A 7/1991 Axelson et al.
5,098,156 A * 3/1992 Vogel ......................... 297/232
5,102,195 A 4/1992 Axelson et al.
5,120,103 A * 6/1992 Kave ........................... 296/19
5,127,709 A 7/1992 Rubinstein et al.
5,215,352 A 6/1993 Yeh et al.
5,301,964 A 4/1994 Papac
5,364,162 A 11/1994 Bar et al.
5,372,405 A * 12/1994 Cash et al. ................. 297/383
5,380,034 A 1/1995 Wilson
5,441,330 A * 8/1995 Rojas .......................... 297/383
5,564,786 A 10/1996 Peek et al.
5,599,066 A 2/1997 Chih
5,807,219 A 9/1998 Webber et al.
5,848,824 A 12/1998 Mocur (Continued)

OTHER PUBLICATIONS

Brochure: "Quantum Seating Options," Quantum Rehab. A DIvision of PRide Mobility Products Corp. 4 pages (undated).

*Primary Examiner*—Peter M. Cuomo
*Assistant Examiner*—Stephen D'Adamo
(74) *Attorney, Agent, or Firm*—Drinker Biddle & Reath LLP

(57) ABSTRACT

An adjustable seat support assembly for a wheelchair. The seat support assembly includes a seat bottom frame and a seat back frame. The seat bottom frame has at least two spaced apart beams. Each beam includes at least one channel that extends along at least a portion of the beam. Preferably the channel extends along the entire length of the beam. A seat plate is mounted to and extends between the beams. The seat back frame includes two vertical supports. Each support has an upper end and a lower end. At least one back frame cross-bar is attached to and extends between the vertical supports. A mounting bracket is attached to the lower end of each support and removably attached to a channel in one of the beams. Preferably there are two or more channels formed in each beam, one channel in the bottom and the other in the side.

31 Claims, 11 Drawing Sheets

U.S. PATENT DOCUMENTS 5,884,928 A 3/1999 Papac
5,902,013 A 5/1999 Hong
5,904,400 A 5/1999 Wei
5,947,562 A 9/1999 Christofferson et al.
5,984,418 A 11/1999 McInturff
5,996,716 A 12/1999 Montiglio et al.
6,036,268 A * 3/2000 Larson .................. 297/423.26
6,086,086 A 7/2000 Hanson et al.
6,086,157 A 7/2000 Toso
6,105,183 A 8/2000 Bly
6,105,706 A 8/2000 Cooper
6,129,165 A 10/2000 Schaffner et al.
6,139,037 A 10/2000 Papac
6,158,810 A 12/2000 Galloway
6,244,662 B1 6/2001 Porcheron
6,273,510 B1 * 8/2001 Ehemann ............... 297/440.22
6,331,036 B1 12/2001 Papac
6,352,307 B1 3/2002 Engman ................ 297/284.11
6,532,307 B1 * 3/2003 Sato ........................... 382/240
2003/0025379 A1 * 2/2003 Liu ....................... 297/452.18

* cited by examiner

ADJUSTABLE SEAT SUPPORT FOR A WHEELCHAIR

RELATED APPLICATION

This application is related to and claims priority from U.S. Provisional Application No. 60/430,582, filed Dec. 3, 2002, entitled "Adjustable Seat Support for a Wheelchair," which is incorporated by reference herein its entirety.

FIELD OF THE INVENTION

The present invention relates to seats for wheelchairs and, more particularly, to an adjustable wheelchair seat support system which provides increased versatility.

BACKGROUND OF THE INVENTION

Adjustable seats for wheelchairs have been around for quite some time. such designs permit the seat bottom and back to be adjusted with respect to the main frame of the chair, either independently or as a unit.

The ability of a seat in wheelchairs to adjust is not only a desirable feature but, in some cases, is a necessity. For example, since the user of a wheelchair may be sitting in the wheelchair for long periods of time, ranging anywhere from several minutes to a full day or more, the orientation of the seat and the positioning of the seats individual components should be configured to provide the user with the maximum amount of comfort. In some cases medical conditions or physical constraints actually require a specific seat configuration. Also, differences in the height and size of the user favor that a chair seat be adjustable to some degree.

One successful adjustable seat design has been marketed by Pride Mobility Products, Inc. of Exeter, Pa. under the tradename VERSA-SEAT. The seat is designed to permit separate adjustment of the back of the seat with respect to the bottom of the seat. Specifically, as shown in FIG. 1, the seat bottom includes a seat frame that has two horizontal spaced-apart tubular longitudinal beams and two lateral cross-bars. The cross-bars are adjustable (i.e., capable of telescoping) so as to permit variation in the spacing of the longitudinal beams. The longitudinal beams include a plurality of mounting holes along the sides of the beams from the front to back ends of the beams. Each end of a cross-bar is bolted to the beams though one of the mounting holes. Using the same mounting hole, a frame mounting bracket is bolted to the beam and mounted to the chair frame. A seat support plate is hinged to a third cross-bar so as to allow the seat plate to be pivoted upward to access the area under the seat. Clips are mounted to the bottom of the support plate and engage with the cross-bars on the seat frame. A seat bottom cushion is attached to the seat support plate.

The back of the seat includes a back frame with two spaced-apart vertical tubular supports or canes and at least one cross-bar. Like the cross-bars on the seat frame, the cross-bar on the back frame is capable of telescoping so as to permit variation in the spacing of the vertical supports. The ends of the cross-bar are clamped to the vertical supports. Each support has a L-shaped bracket welded to its lower end. The horizontal leg of the bracket includes a plurality of mounting holes which are used to bolt the vertical support to selected mounting holes in the beam. The vertical support can be bolted at any longitudinal location along the longitudinal beams. Also, by choosing different combinations of mounting holes on the L-shaped bracket different angular orientations of the back with respect to the seat bottom can be obtained. A back cushion is attached to the vertical supports.

An arm rest is pivotally clamped to each vertical support. A stop 98 may be attached to one of the supports and located at a suitable position below the arm rest so as to prevent or inhibit downward rotation of the armrest below a desired point (e.g., below the horizontal).

The front ends of the horizontal beams are open so as to receive a support frame for a front mounted accessory, such as leg rests, foot rests or foot pads. The support frame is slidably disposed within each horizontal beams. The bolts that attach the forward cross-bar also secure the support frame to the horizontal beam.

Arm rests are attached to the vertical supports so as to permit height adjustment of the arm rests with respect to the seat bottom.

While the VERSA-SEAT system provides a vast improvement over conventional seating systems since it permits a seat to be tailored to a particular user, an even more improved and user friendly seat system would be welcomed by wheelchair users.

SUMMARY OF THE INVENTION

The present invention is directed to an improved adjustable seat support assembly for a wheelchair. The seat support assembly includes a seat bottom frame and a seat back frame. The seat bottom frame has at least two spaced apart beams. Each beam includes at least one channel that extends along at least a portion of the beam. Preferably the channel extends along the entire length of the beam. A seat plate is mounted to and extends between the beams.

The seat back frame includes two vertical supports. Each support has an upper end and a lower end. At least one back frame cross-bar is attached to and extends between the vertical supports. A mounting bracket is attached to the lower end of each support and removably attached to a channel in one of the beams.

In one embodiment of the invention there are two channels formed in each beam, one channel in the bottom and the other in the side. In another embodiment there are three channels formed in each beam, one channel formed in the bottom and the other channels formed in the opposed sides.

Various components can be slidably mounted to the channels. For instance, in one embodiment, seat mounting shafts, which attach the seat support structure to the wheelchair main frame, are attached to the beams by means of the channels. The vertical supports are also attached to the beam using the channels, thus permitting the back frame to be slidably translated along the channels.

Other objects, aspects and advantages of the present invention will become apparent to those skilled in the art upon reading the following detailed description, when considered in conjunction with the appended claims and the accompanying drawings briefly described below.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DESCRIPTION OF THE PREFERRED EMBODIMENTS

Figure 2:
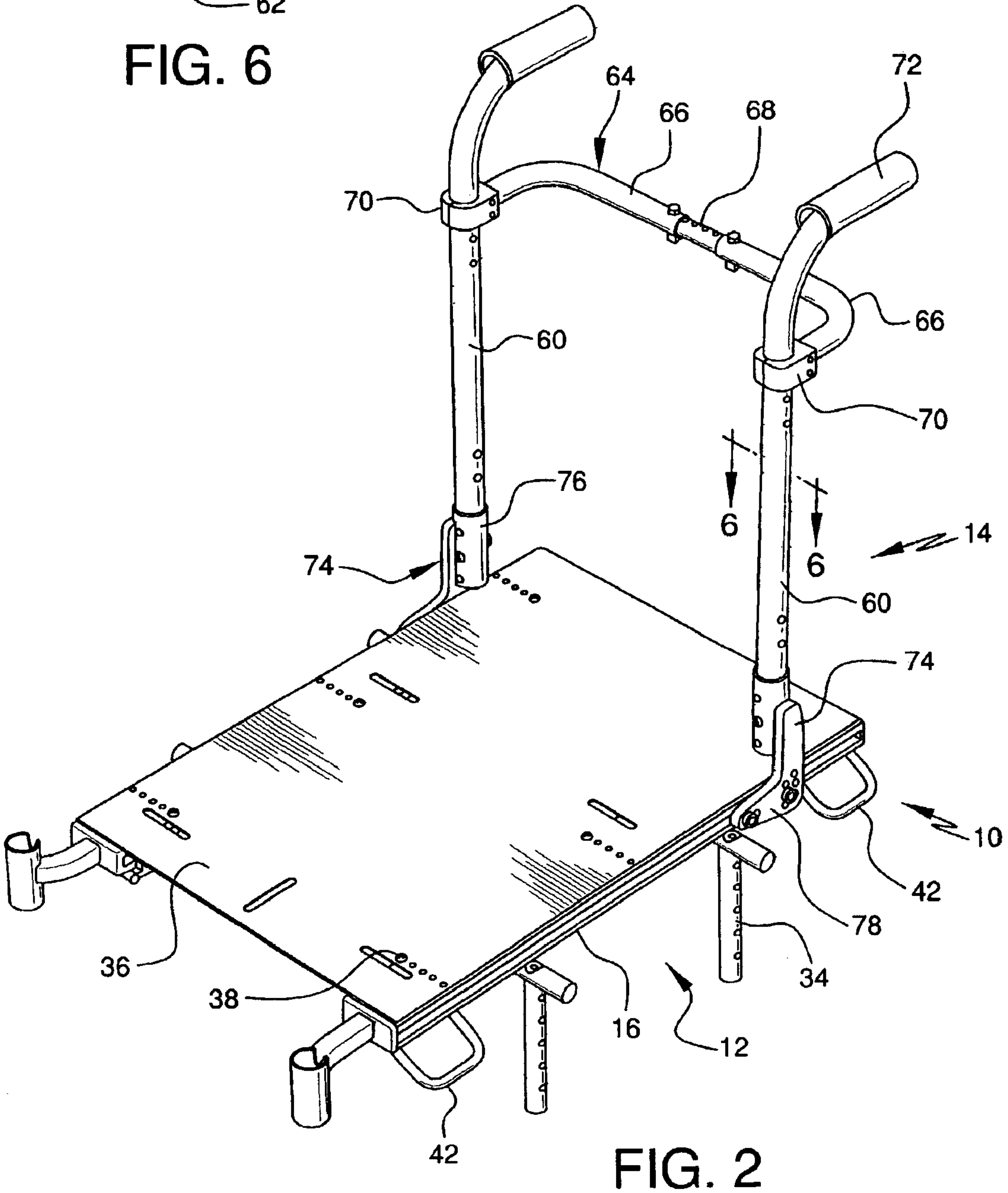
FIG. 2 is an isometric view of an embodiment of the adjustable seat according to the present invention.

Referring now to the drawings wherein like reference numeral refer to like elements throughout the figures, FIG. 2 illustrates an isometric view of one embodiment of the adjustable seat support structure 10 according to the present invention. The seat support structure 10 is designed to mount to a wheel chair frame (not shown) and support seat and back cushions (not shown).

Figure 3:
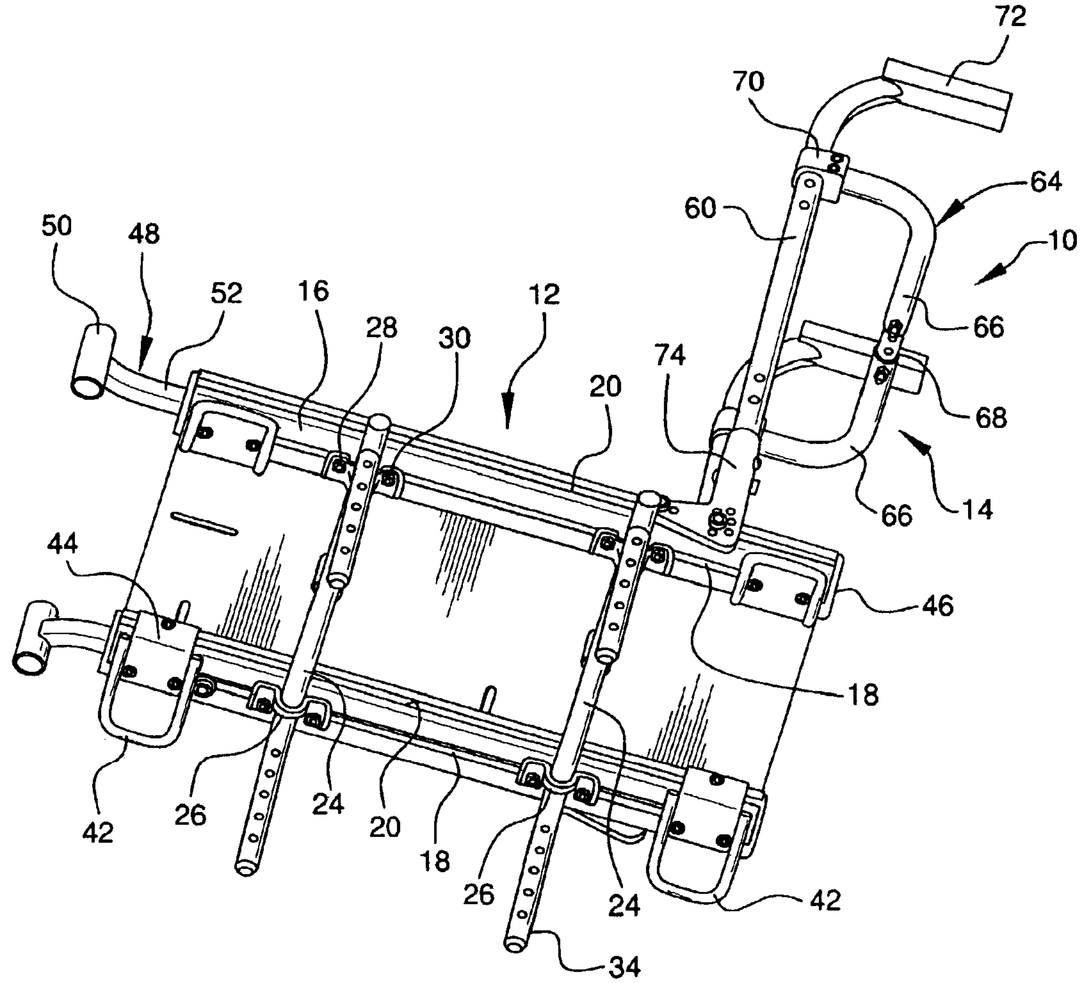
FIG. 3 is an isometric view of the adjustable seat of FIG. 1 illustrating the bottom of the seat support in more detail.

The support structure 10 includes a seat bottom frame 12 and a seat back frame 14. The seat bottom frame 12 is best illustrated in FIGS. 2 and 3. The frame 12 includes two longitudinal beams 16 which extend parallel to a longitudinal axis of the chair. The longitudinal beams have at least one channel formed in and extending along at least a portion of each beam. More preferably, there are two channels formed in each beam. In one embodiment of the invention shown in FIG. 4, one channel 18 is formed in the bottom of the beam (bottom channel) and the other channel 20 is formed in an outwardly facing lateral side of the beam (side channel). In another embodiment of the invention shown in FIG. 5, there are two side channels 20 and one bottom channel 18 formed in each beam 16. The channels preferably extend along the entire length of the beams 16. The beam 16 is preferably formed in a single extrusion, although forming channels in separate beam components which are assembled to create a unitary beam is also contemplated. The beam can be made from any suitable material, although a lightweight material, such as aluminum, plastic or composite material, is preferable.

Figure 4:
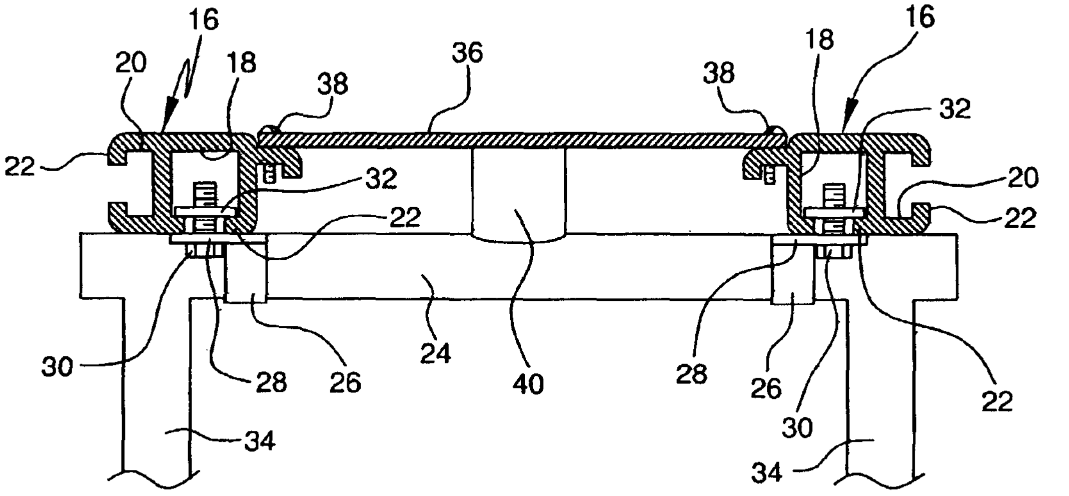
FIG. 4 is a cross-section of a seat bottom frame according to one embodiment of the invention.
Figure 5:
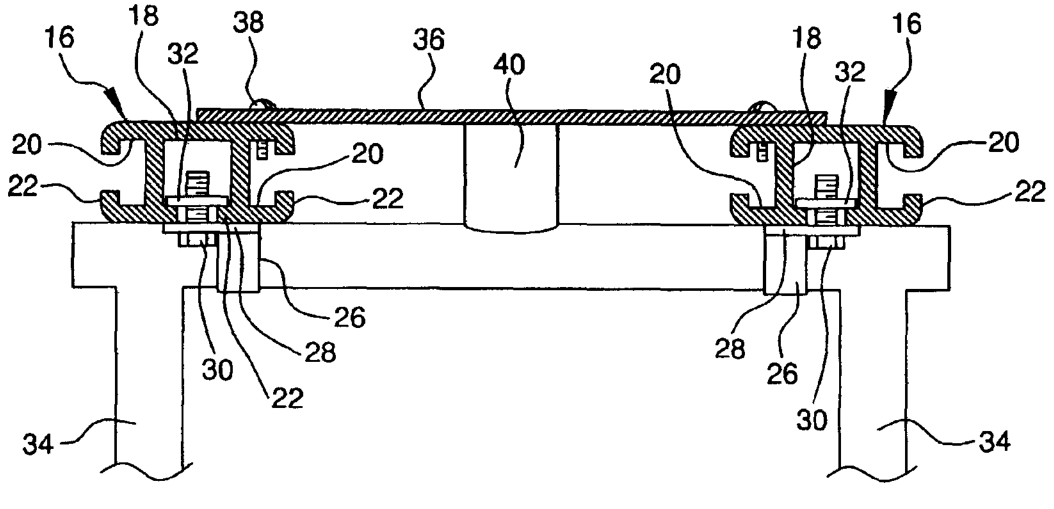
FIG. 5 is a cross-section of a seat bottom frame according to another embodiment of the invention.

As will become more apparent below, the channels are preferably T-shaped with rims or lips 22 on the side with an open slot. The rims 22 assist in retaining a locking element within the channel. FIGS. 4 and 5 illustrate the preferred shape of the beams. It is contemplated that the channels 18, 20 can be connected to one another so as to have one interior cavity with two separate outward openings.

The beams are mounted to the wheelchair frame (not shown) in a spaced apart relationship from one another. As shown in FIGS. 3, two cross-bars 24 extend between the beams. The cross-bars 24 are preferably tubular in shape and removably secured to the beams 16. In one embodiment, the cross-bars 24 are clamped to the beams 16 with brackets 26. Each bracket has at least one and more preferably two mounting flanges 28. Referring to FIGS. 4 and 5, a fastener 30, such as a bolt, extends through a hole in the flange 28 and engages with a locking element 32, such as a mounting nut or block with a threaded insert, located within the bottom channel 18. Tightening of the fastener 30 clamps the brackets 26 to the beam 16. Those skilled in the art would be readily able to select a suitable fastener and locking element. Preferably the fastener can be tightened and loosened using conventional tools or by hand.

Since the bottom channel 18 is used for mounting the cross-bars 24 to the beam 16, the cross-bars 24 can be attached at any suitable longitudinal position along the beam 16. Also, since in the illustrated embodiment brackets 26 are used to clamp the cross-bars 24 to the beams 16, the spacing of the beams 16 can be adjusted simply by loosening the fasteners 30 without fully removing them, thus permitting easy adjustments "on-the-go." This arrangement also permits the attachment of vertical mounting shafts 34 to the cross-bars 24. The mounting shafts 34 have a series of spaced apart holes which permit the shafts 34 to be removably secured to supports on the wheelchair frame (not shown) at different vertical positions. The attachment of the mounting shafts 34 to the main chair frame is conventional and, thus, no further discussion is needed. The mounting shafts 34 may be attached to the cross-bar using any suitable means. The illustrated embodiment uses fasteners which extend through the cross-bar 24 and thread into an upper end of the shaft 34.

Referring to FIGS. 2, 4 and 5, a seat support plate or pan 36 is attached to the beams 16. The seat support pan is preferably planar in shape and made from metal. The support pan 36 is attached to the beams 16 using any suitable fastener. In the illustrated embodiment, a bolt or screw 38 is inserted through a selected one of a plurality of holes in the support pan 36 and a corresponding hole in the beam 16 where the bolt/screw engages with a nut or, more preferably, threads into holes in the beam to properly position the pan on the beam. The spacing of the holes in the support pan 36 defines the spacing of the beams and, thus, allows the width of the seat bottom frame to be tailored to the particular user. Also, the pan 36 assists in keeping the entire seat frame square. Since the spacing and angular orientation of beams would otherwise be infinitely adjustable, the mounting holes on the pan limit the spacing. Slots can be used to provide limited adjustability if desired. A seat cushion is attached to the pan with any conventional mechanism. Preferably a VELCRO fastening system is used. (VELCRO is a trademark of Velcro USA, Inc. for hook and loop fasteners.)

A spacer 40 is located between the seat support pan 36 and the cross-bar 24 for providing increased stability of the support plate. The spacer 40 is preferably removably attached to the center of each cross-bar 24. The spacer is preferably made from rubber or plastic.

Although cross-bars are shown in the figures, it is also contemplated that the seat pan 36 in combination with the beams 16 may provide sufficient rigidity that cross-bars are unnecessary. In such cases, the vertical seat mounting shafts 34 would be mounted independently to the beams 16 through brackets in a similar manner as described above for the cross-bars 24.

The seat bottom may also include tie-downs 42 which may be adjustably attached to the beams 16. These can be best seen in FIGS. 2 and 3. The tie-downs 42 are used to strap the chair to a fixed point on the ground. The tie-downs 42 include a handle portion and a bracket portion 44. The bracket portion 44 is preferably L-shaped with mounting holes located on both legs. At least one and preferably two of the holes are located so as to permit a fastener to engage with a nut or mounting block located in the bottom channel. At least one hole may be located in the other leg so as to permit a fastener to engage with a nut or mounting block located in the side channel. Since the channels are used to secure the tie-downs 42 to the beam 16, the tie-downs can be mounted at any desired location along the beam 16. The tie-downs are preferably made from a metallic material, such as aluminum or steel.

The front and back of each channel is preferably open to permit placement in the channels of the locking elements, such as nuts or mounting blocks with threaded inserts. As discussed above, the locking elements work in combination with fasteners to secure the various components to the beam 16. It should be readily apparent that clamps, latches or similar fastening devices can be used in the present invention with one part of the fastening device located within the channel and the other part of the fastening device located so as to attach the various components to the beams.

An end cap 46 may be removably engaged with one of more of the channels to close off the end of the channels during use. The cap 46 can be made of any material, although a plastic end cap is preferable. The cap 46 can be attached to the beam with screws or, alternately, may include tangs (not shown) that extend into the channel and which frictionally retain the cap 46 on the beam 16.

In the illustrated embodiment, a leg rest hanger 48 is shown mounted to the front of each beam 16. In this embodiment, end caps 46 are not needed in the front of the beams. The leg rest hangers include a cylindrical retainer 50 and a mounting rod 52. The mounting rod 52 preferably has a shape which can be slidably disposed within the bottom channel 18 and/or the side channel 20. The rod 52 preferably includes a plurality of mounting holes (not shown) which can be engaged by fasteners for attaching the leg rest hanger 48 to the beams 16. In the embodiment shown, the rods 52 are tubular and include mounting nuts or threaded inserts in the rod 52. As such, the bolts which are used to secure the tie-down engage with the mounting nuts inside the rods 52, thereby permitting one set of fasteners to attach both components. It is also contemplated that the rod 52 may simply be press fit into the end of the beam 16.

Although the illustrated embodiment shows leg rest hangers 50, other types of devices can be attached to the ends or sides of the beams, such as leg pad supports, foot rest supports, accessory cups, oxygen tank supports, etc.

Figure 1:
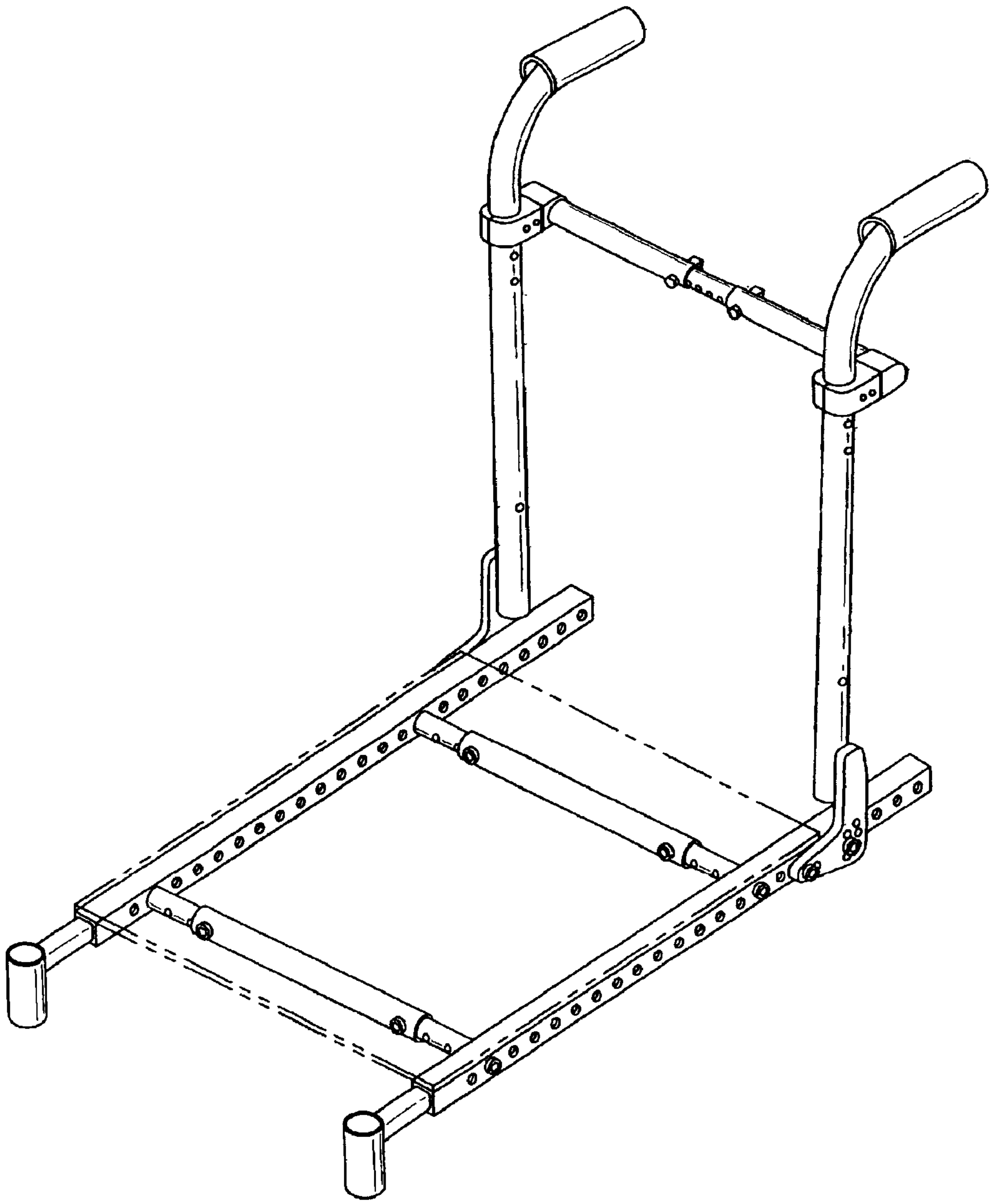
FIG. 1 ( PRIOR ART )
FIG. 1 is a perspective view of a conventional adjustable seat support structure for a wheelchair.
Figure 6:
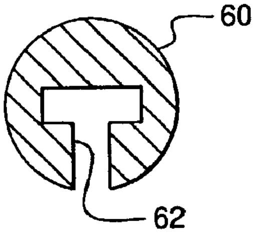
FIG. 6 is a cross-section of a vertical support taken along lines 6—6 in FIG. 2.

The seat back frame 14 includes two spaced-apart vertical tubular supports or canes 60. As shown in FIG. 6, the canes 60 preferably have a T-shaped slot or channel 62 formed in them for receiving and attaching components, such as a cross-bar 64, to the canes 60. The canes 60 may also include holes for mounting components to the canes 60.

The cross-bar 64 is preferably adjustable so as to permit variation in the spacing between the vertical canes 60. More preferably, as shown, the cross-bar 64 is preferably tubular with two L-shaped arms 66 and a tubular connector 68. The connector 68 slides in or on the adjacent ends of the arms 66 and is attached thereto to set the length of the cross-bar 64. The opposite ends of the L-shaped arms 66 are attached to the canes by clamps 70. Alternately, the ends could be attached to the slots in the canes. Grips 72 are preferably formed on the upper ends of the canes 60 to facilitate grasping by a person to provide comfort while pushing the wheelchair.

The back seat frame 14 is preferably attached to the beams 16 so as to permit the frame 14 to be moved longitudinally along the beams 16. in the illustrated embodiment, an L-shaped support bracket 74 is welded or attached to the lower end of each cane 60. Each bracket 74 preferably includes a cylindrical housing 76 in which the bottom of the cane 60 is located. Preferably the housing 76 includes one or more holes through which a fastener, such as a bolt or screw, extends and engages with a corresponding hole in the cane 60 or a mounting nut in the slot 62. Alternatively, the housing 76 may include a T-shaped tongue which extends inward into the housing and is positioned so as to slide within the T-shaped slot in the cane 60. As shown in phantom, the bracket 74 may also include a handle 75 which can be used as a tie-down or to facilitate movement of the wheelchair.

Figure 7A:
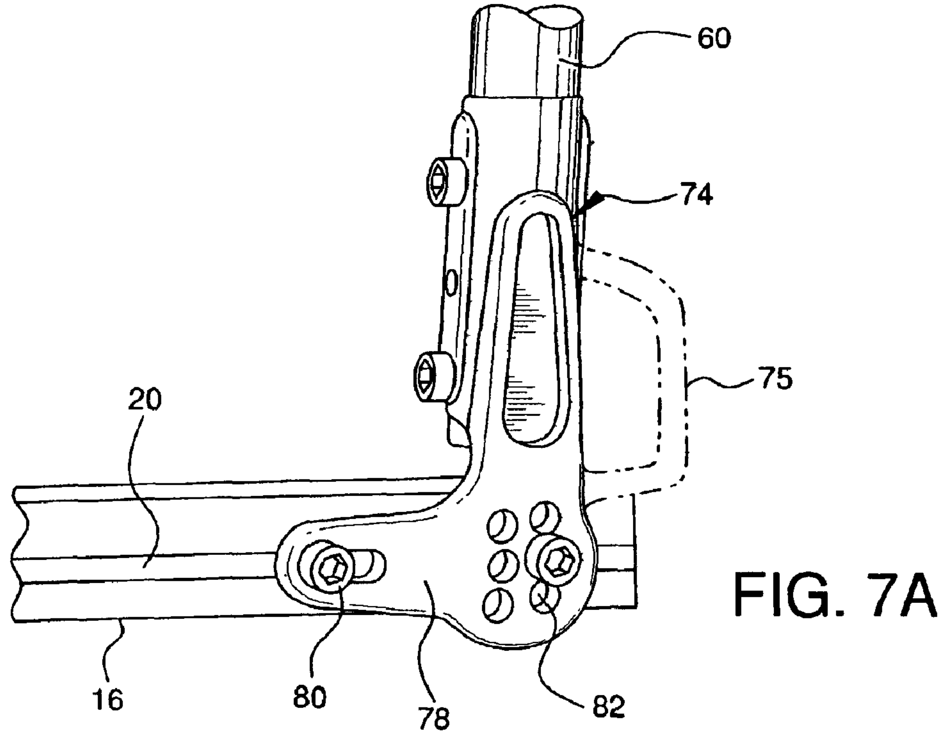
FIGS. 7A and 7B illustrate the attachment of the vertical supports to a beam in two different angular orientations.
Figure 7B:
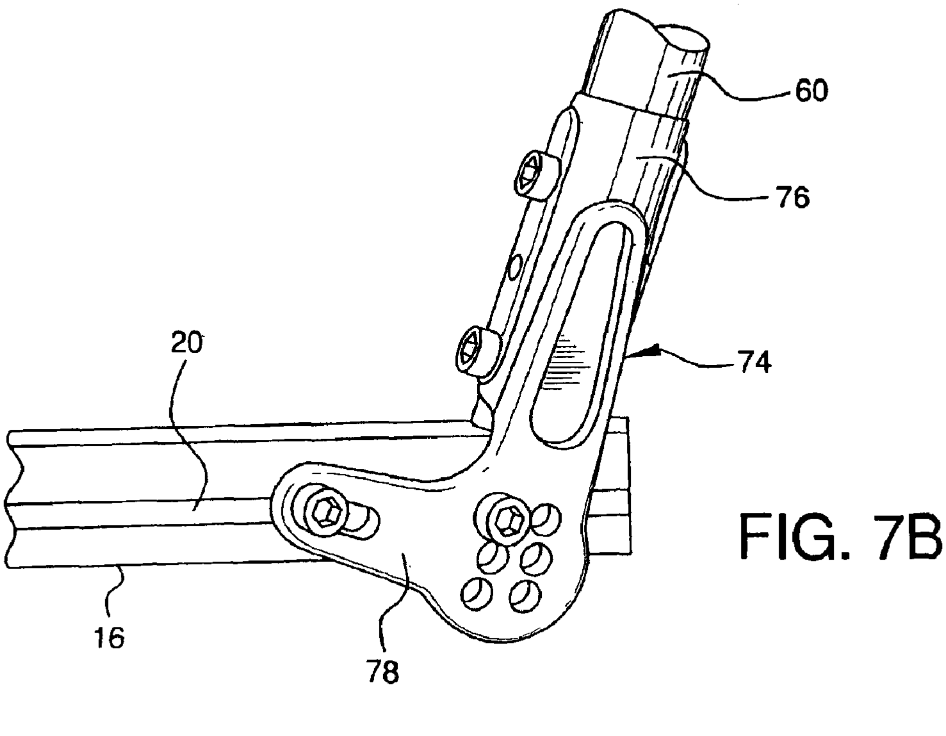

The horizontal leg 78 of the bracket 74 includes a plurality of apertures (e.g., mounting holes which are used to bolt the bracket 74 to the beam 16. More specifically, the bracket preferably includes a forward aperture (e.g., hole or slot 80) and a plurality of aft apertures (e.g., holes or slots 82) arranged so that a combination of the forward hole with each of the aft holes orients the bracket 74 at a plurality of different angular positions with respect to the beam 16, and thus the seat bottom fame 12. FIGS. 7A and 7B illustrate two different mounting positions of the bracket 74 on the beam 16. The attachment is preferably similar to the other mounting methods described above, and preferably includes bolts which engage with nuts or mounting blocks located within the side channel 20.

A back cushion or support pad (not shown) is attached to the vertical supports 60 of the seat back frame in a conventional manner. Preferably the back support pad is wrapped around the canes and attached with hook and loop fasteners, such as VELCRO. Similarly, as discussed above, a seat cushion is attached to the seat pan 36 or the beams 16 in a conventional manner.

Figure 8:
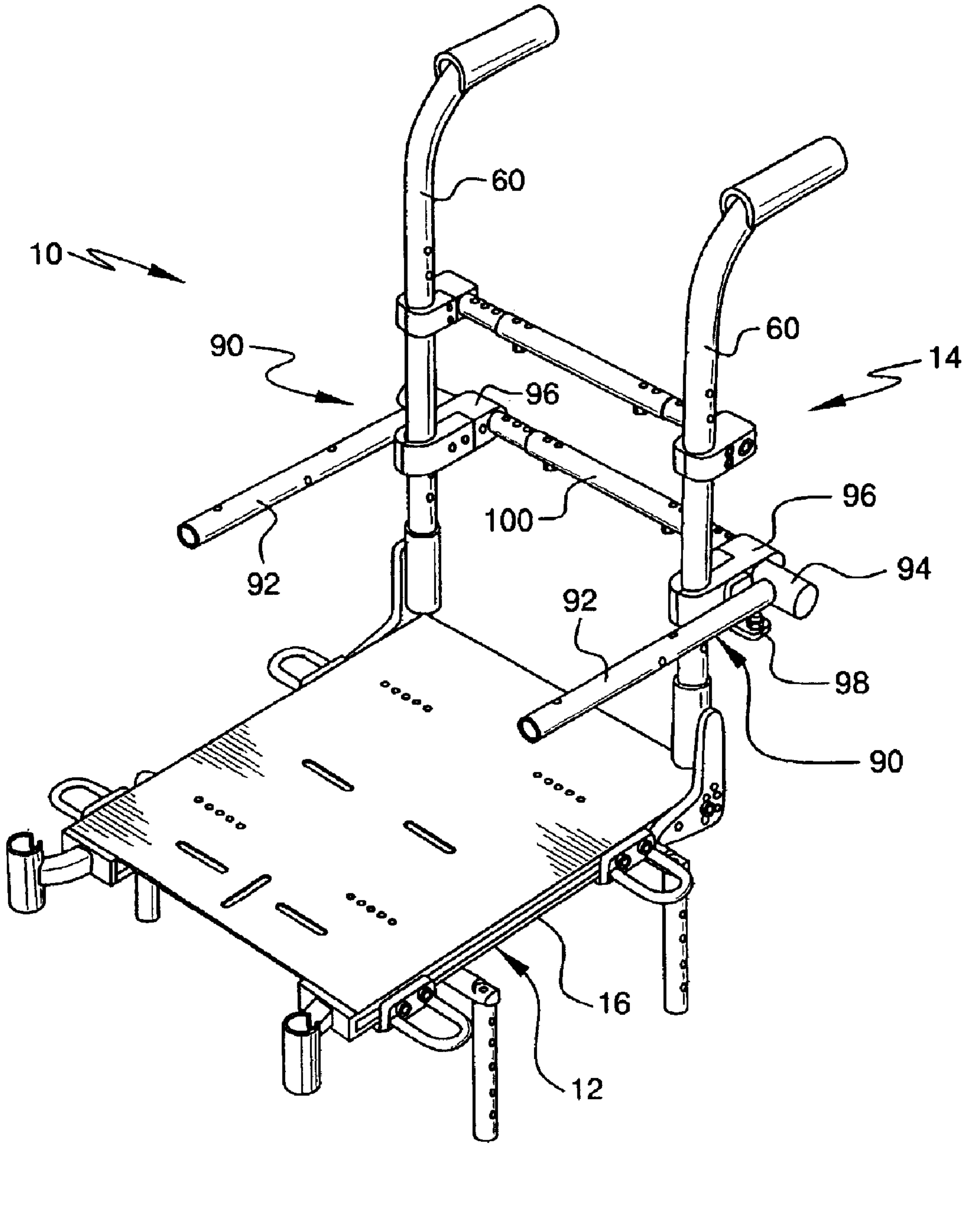
FIG. 8 is an embodiment of the invention illustrating the mounting of an armrest according to one embodiment of the invention.

In one embodiment of the invention, armrest supports on the chair are also slidably mounted to the side channel 20, of the frame. The mounting is similar to the attachment of the bracket 74 and tie-downs 42. This mounting arrangement allows each armrest to be independently adjusted with respect to the seat bottom and the back. Alternately, as shown in FIG. 8, the armrest supports 90 may be mounted to the vertical canes 60 of the seat back frame 14. More particularly, each armrest support 90 includes a support bar 92 which is mounted to a base 94. Any conventional mounting method can be used such as fastening or welding. The base 94 is pivotally attached to a fixture 96 so as to permit the support bar 92 to be pivoted vertically upward about a lateral axis. As shown in FIG. 8, the fixture 96 preferably includes two halves which clamp around the cane 60 in a similar manner as the mounting of the clamps 70 for the back frame cross-bar 64. A stop 98 may be attached to one of the fixture halves 96 and located at a suitable position below the support bar 92 so as to prevent or inhibit downward rotation of the bar 92 below a desired point (e.g., below the horizontal). A cross-bar 100 may be attached between adjacent fixtures 96 as shown so as to provide the back frame with additional support.

Figure 9A:
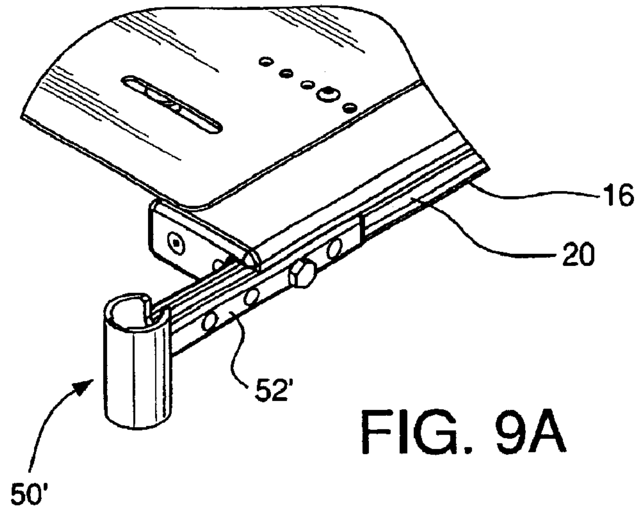
FIGS. 9A and 9B illustrate an alternate mounting arrangement for a leg rest according to one embodiment of the invention.
Figure 9B:
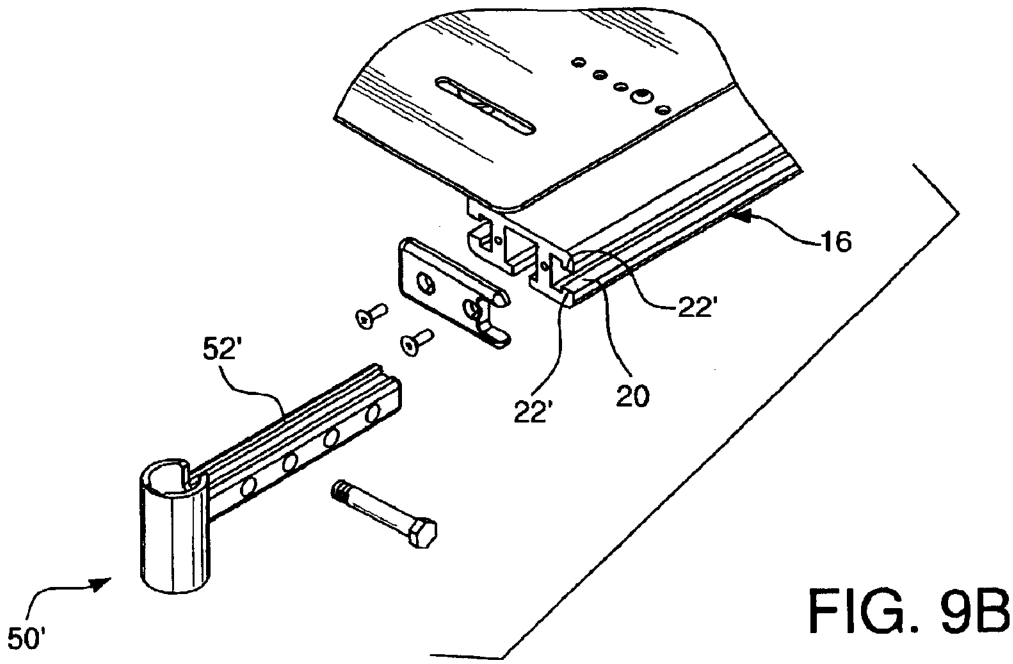

Referring now to FIGS. 9A and 9B, an alternate embodiment of the seating system is shown. In this embodiment, the leg rest hangers 50' include an I-shaped (or T-shaped) mounting rod 52' which is configured to slide within the outer (or inner) side channel 20 of the longitudinal beam 16. The rims 22' prevent the leg rest from sliding laterally off the beam 16. As with the prior embodiment described above, the rods 52' include mounting holes for attached the leg rest hanger 50' to the beam 16.

By mounting the leg rest hangers in the outer (or inner) channel in the beam 16, the system permits the lateral positioning of the leg rest to be varied depending on the user's needs. This permits the seating system to accommodate the growth of the user. Also, the side channel mounting of the leg rest hanger permits additional longitudinal mounting positions for the seat to attach to the mounting shafts 34.

Figure 10A:
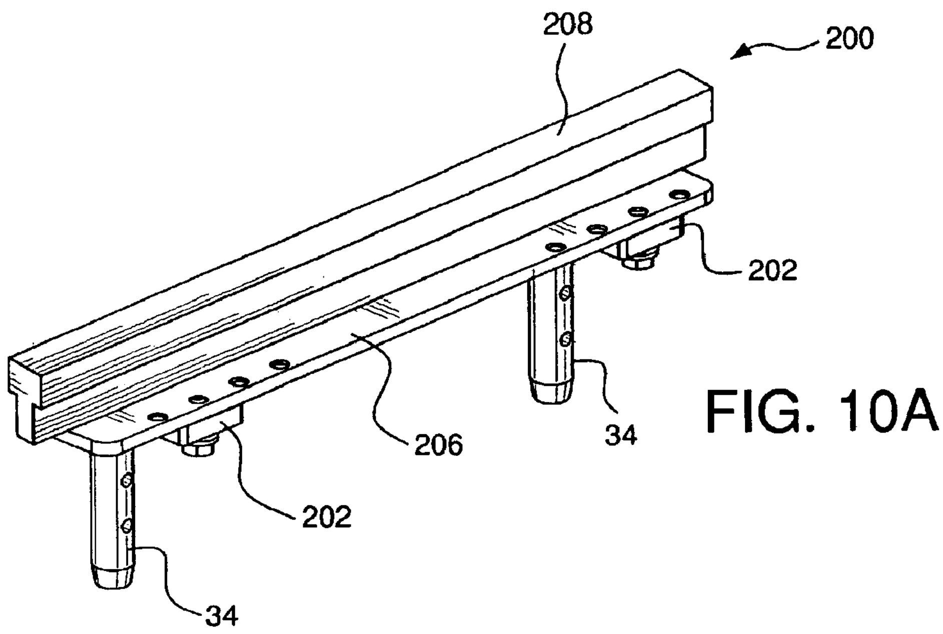
FIGS. 10A, 10B and 10C illustrate an alternate seat post assembly according to one embodiment of the invention.
Figure 10B:
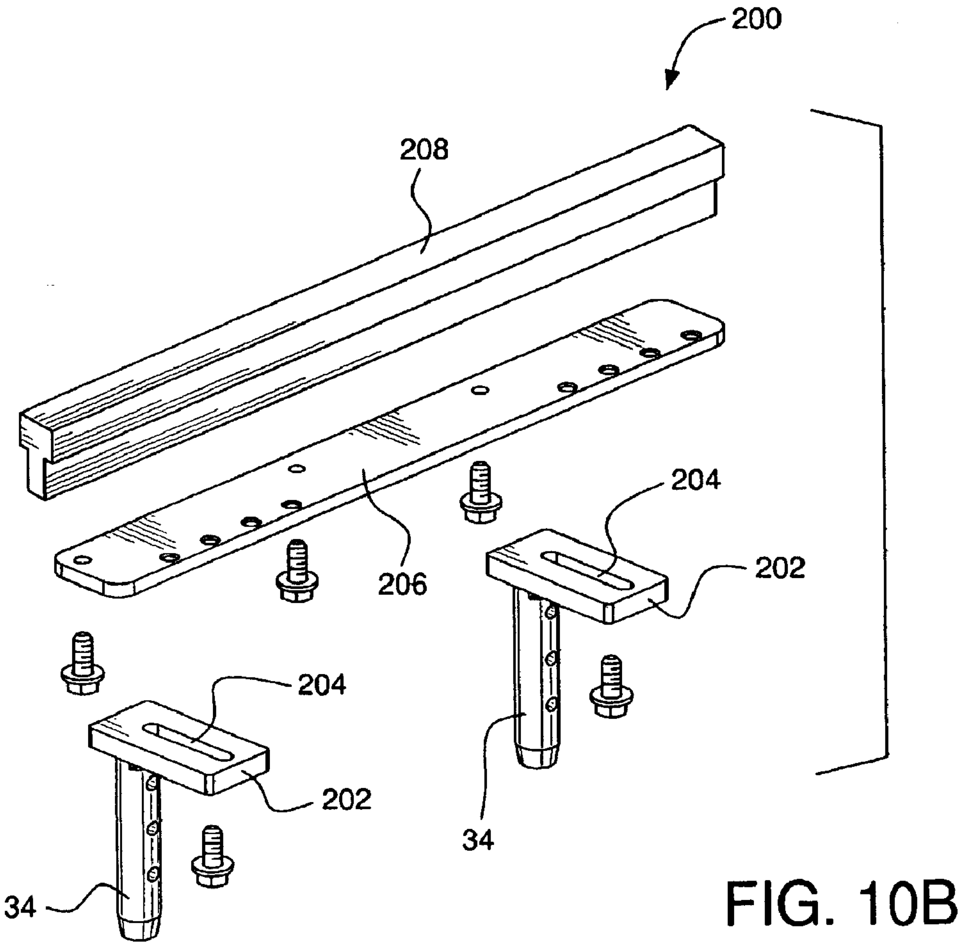
Figure 10C:
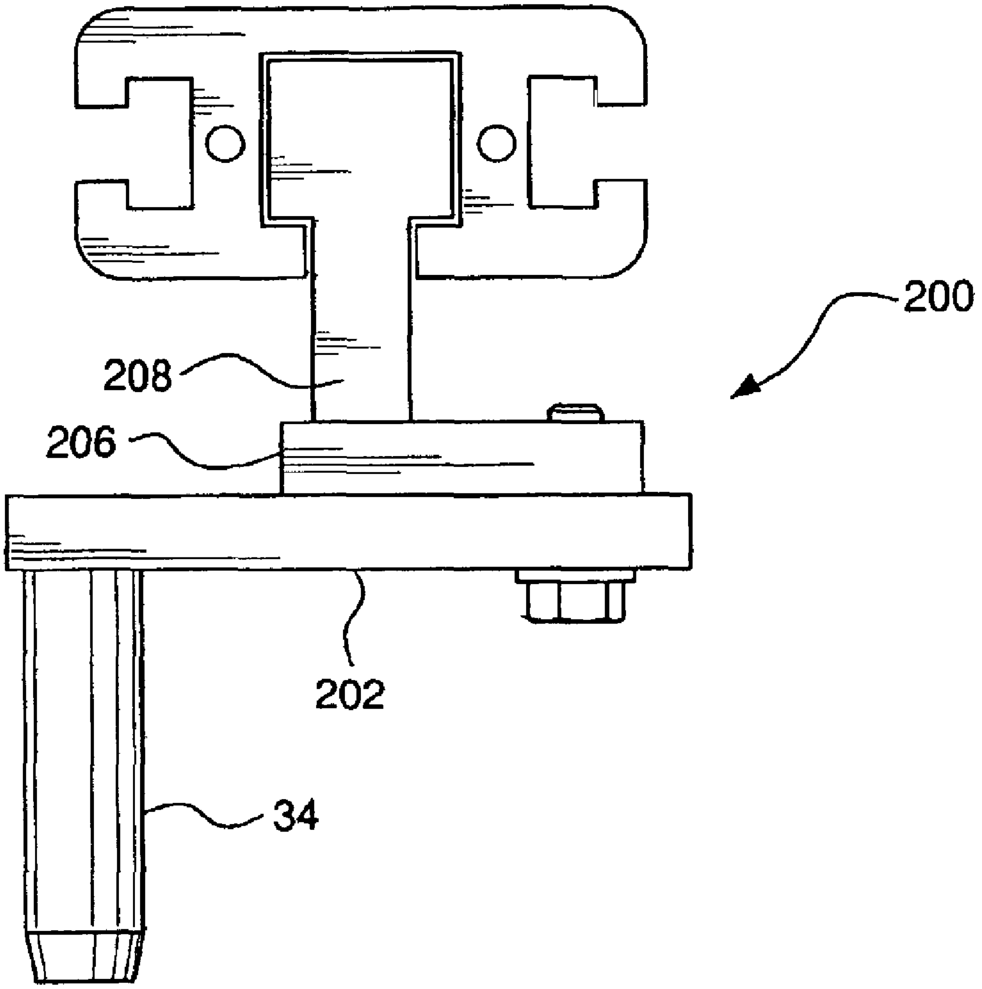

An alternate assembly for mounting the beams to the chair frame is shown in FIGS. 10A-10C. In this embodiment, the cross-bars have been replaced by longitudinal support rails 200. More particularly, each mounting shaft 34 is attached to a connector plate 202. The connector plate 202 includes a slot 204 for mounting the connector plate to a longitudinal brace 206. The longitudinal brace 206 is used to connect the fore and aft mounting shafts 34 to one another. The brace 206 includes a plurality of holes to permit the connector plates to be mounted at various axial (longitudinal) positions. The slot 204 on the connector plate 202, in turn, permits the mounting shaft 34 to be located at various lateral positions relative to the brace 206.

A rail 208 is attached to or formed integral with the brace 206 so that it projects upward from the top of the brace 206. The rail 208 is preferably T-shaped and sized to engage with the bottom channel 18 of the beam 16 such that the beam (and, thus, the entire seat) can be translated axially with respect to the mounting shafts (and, thus, the wheelchair frame.) The rail can be made from any suitable material, such as nylon, metal, plastic, or composite material.

In order to inhibit the beam 16 from sliding off the rail 208, and to prevent the support bracket 74 (and the canes) from sliding off the beam 16, removable fasteners 210 preferably extend through the beam 16. More particularly, referring to FIGS. 11A–11D, a removable pin 210 is inserted through a hole formed in the beam 16, extending through the side and bottom channels. The pin 210 engages with a hole formed in the rail 208, thus removably attaching the rail 208 to the beam 16. The pin 210 is preferably removable by hand to as to permit quick and easy disassembly of the chair.

In one embodiment of the invention, the seating system includes a fixed pin 210A on one side of the chair and a quick-release pin 210B on the opposite side. Various types of quick release pins can be used in the present invention. One preferred quick-release pin is shown in FIGS. 11B and 11D, and includes a release knob with a spring loaded locking mechanism. Pulling on the release knob causes disengagement of the locking mechanism, thus permitting the pin 210B to be removed. A spring 211 inside the pin 210B biases the locking mechanism (e.g., plunger) into its locked position. Quick release pins are well known in the art and, therefore, no further discussion is necessary.

Figure 11A:
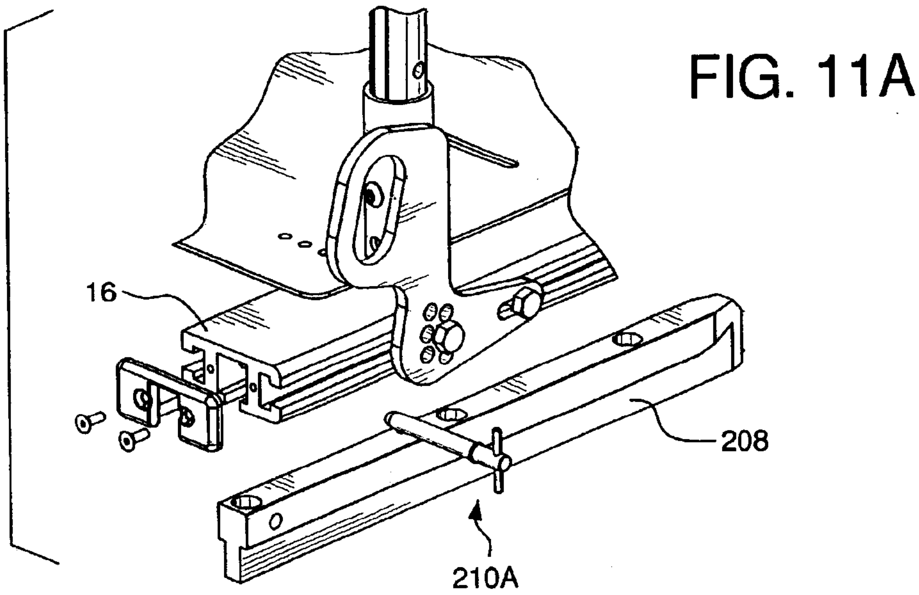
FIGS. 11A–11D illustrate removable locking assemblies for use in attached the horizontal beams to seat support rails according to one embodiment of the invention
Figure 11B:
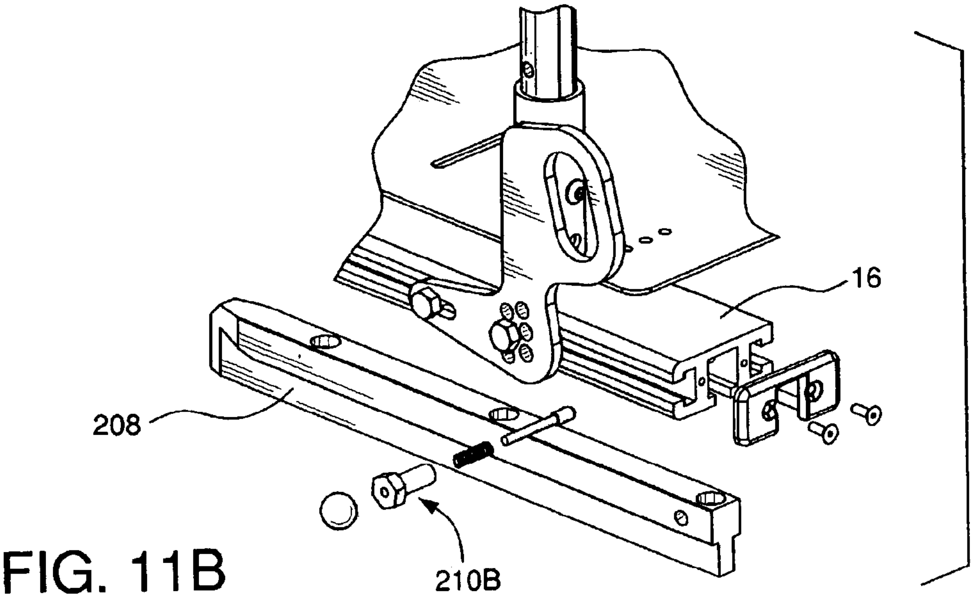
Figure 11C:
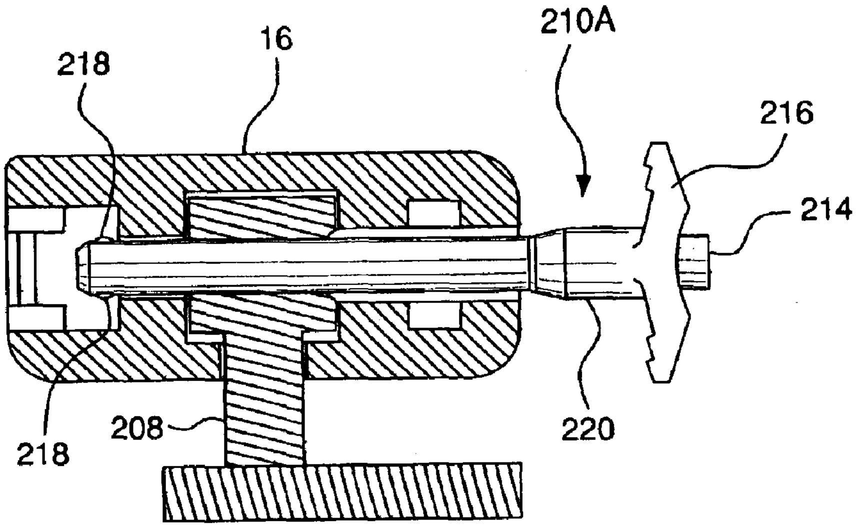
Figure 11D:
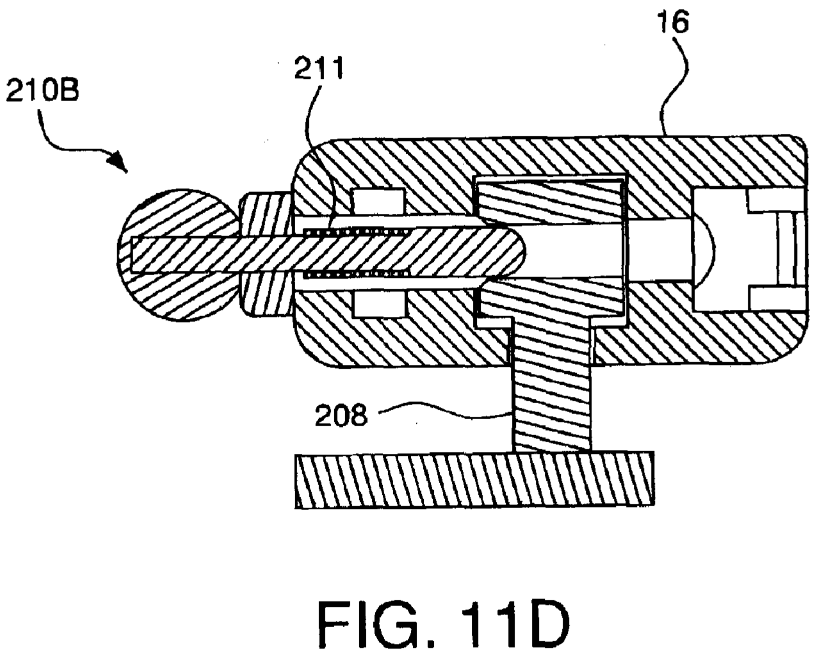

The fixed pin 210A is illustrated in FIGS. 11A and 11C and is a conventional push-button operated quick-release pin. Depressing a button 214 located on a handle 216 causes the locking balls 218 the be disengaged. This permits the balls to recess into the shaft 220 of the pin. A suitable fixed pin 210A is available from McMaster-Carr, New Brunswick, N.J., part number 93750A320.

The seat support assembly described above provides a novel and innovative system which facilitates adjustment of a wheelchair seat to permit specific tailoring of the seat to the user, thus, increasing the user's comfort.

Accordingly, although the invention has been described and illustrated with respect to the exemplary embodiments thereof, it should be understood by those skilled in the art that the foregoing and various other changes, omissions and additions may be made therein and thereto, without parting from the spirit and scope of the claims.

What is claimed is:

1. A seat support assembly for a wheelchair comprising:

a seat bottom frame including at least two spaced apart beams, each beam including a first channel formed in a bottom of the beam and a second channel formed in an outwardly facing side of the beam, the channels extending along at least a portion of the beam, a seat plate mounted to and extending between the beams; and a seat back frame including two vertical supports, each support having an upper end and a lower end, at least one back frame cross-bar attached to and extending between the vertical supports, and a mounting bracket attached to the lower end of each support and slideably mounted to the second channel in one each of the beams.

2. A seat support assembly according to claim 1, wherein the first and second channels are T-shaped and extend the entire length of the beam, the channels being open at the ends of the beam.

3. A seat support assembly according to claim 1, wherein there is a third channel formed in the inwardly facing side of each beam, the first, second and third channels each extending along the entire length of the beam, and the channels being open at the ends of the beam.

4. A seat support assembly according to claim 1, wherein the seat plate is mounted to the beams by threaded fasteners, the fasteners engaging with threaded nuts located within each of the channels.

5. A seat support assembly according to claim 1, wherein the seat plate is mounted to each the beams by threaded fasteners, the fasteners extending through a hole formed in a flange on each beam, the fasteners engaging with threaded nuts located below the flange.

6. A seat support assembly according to claim 1, further comprising a leg rest support having a mounting rod which is slidably disposed within one of the first or second channels of at least one of the beams.

7. A seat support assembly according to claim 1, wherein the mounting bracket includes a first mounting aperture and a plurality of second mounting apertures, the first mounting aperture being spaced apart from the plurality of second mounting apertures, and wherein the attachment of the mounting bracket to the second channel in the beam is through the use of the first mounting aperture and at least one of the second mounting apertures.

8. A seat support assembly according to claim 7, wherein each mounting bracket includes a housing which receives a lower end of one of the vertical supports.

9. A seat support assembly according to claim 1, wherein each vertical support includes a first vertical channel formed in and extending along at least a portion of the length of the support; and wherein the back frame cross-bar is attached to the vertical supports by a fastener that engages with a locking element located within the first vertical channel.

10. A seat support assembly according to claim 9, wherein the back frame cross-bar is adjustable so as to vary the spacing of the vertical supports.

11. A seat support assembly comprising:

a seat bottom frame including at least two spaced apart beams, each beam including a first channel formed in a bottom of the beam and a second channel formed in a outwardly facing side of the beam, the channels extending alone at least a portion of the beam, a seat plate mounted to and extending, between the beams; and a seat back frame including two vertical supports, each support having an upper end and a lower end, at least one back frame cross-bar attached to and extending between the vertical supports, and a mounting, bracket attached to the lower end of each of the supports and slideably mounted to one of the first or second channels in one of the beams, and a plurality of tie-downs, each tie down being secured to one of the first or second channels on a beam, the tie-downs including a ring portion and a mounting portion.

12. A seat support assembly comprising:

a seat bottom frame including at least two spaced apart beams, each beam including a first channel formed in a bottom of the beam and a second channel formed in a outwardly facing side of the beam, the channels extending along at least a portion of the beam, a seat plate mounted to and extending between the beams; and a seat back frame including two vertical supports, each support having an upper end and a lower end, at least one back frame cross-bar attached to and extending between the vertical supports, and a mounting bracket attached to the lower end of each of the supports and slideably mounted to one of the first or second channels in one of the beams, and at least two seat mounting shafts, one seat mounting shaft attached to one of the first or second channels in a beam, the seat mounting shaft extending downwardly from the beam and adapted to engage a mount formed on a wheelchair frame.

13. A seat support assembly according to claim 12, wherein the mounting shaft is attached to the first channel.

14. A seat support assembly according to claim 12, wherein at least one seat mounting shaft on one beam is attached to a seat mounting shaft on another beam through an adjustable cross-bar.

15. A seat support assembly according to claim 12, wherein there are four seat mounting shafts, two mounting shafts being attached to each beam, and wherein one seat mounting shaft on one beam is attached to a seat mounting shaft on another beam through an adjustable cross-bar.

16. A seat support assembly according to claim 15, further comprising a spacer located below the seat plate and attached to at least one of the adjustable cross-bars.

17. A seat support assembly for a wheelchair comprising:

a seat bottom frame including at least two spaced apart beams, each beam including at least two channels extending along at least a portion of the beam, one channel positioned on a bottom portion of the beam and the other channel positioned on an outwardly facing side of the beam, and a seat plate mounted to and extending between the beams, a plurality of seat mounting shafts for attaching the scat bottom frame to a frame of a wheelchair, at least one seat mounting shaft adjustably attached to the bottom channel in each beam; and a seat back frame including two vertical supports, each support having an upper end and a lower end, at least one adjustable back frame cross-bar attached to and extending between the vertical supports, and a mounting bracket attached to the lower end of each support and attached to at least one of the channels in each beam.

18. A seat support assembly according to claim 17, wherein each channel is T-shaped and extends the entire length of the beam, the channels being open at the ends of the beam.

19. A seat support assembly according to claim 17, further comprising a leg rest support having a mounting rod which is slidably disposed within at least one channel.

20. A seat support assembly according to claim 17, wherein there are three channels that each extend along the entire length of the beam, one channel formed in a bottom of the beam and the other channels formed in the inwardly and outwardly facing sides of the beam, the channels being open at the ends of the beam.

21. A seat support assembly according to claim 20, wherein the seat plate is mounted to the beams by threaded fasteners, the fasteners engaging with threaded nuts located within one of the channels.

22. A seat support assembly according to claim 17, wherein there are four seat mounting shafts, two mounting shafts being attached to each beam, and wherein one seat mounting shaft on one beam is attached to a seat mounting shaft on another beam through an adjustable cross-bar.

23. A seat support assembly according to claim 22, further comprising a spacer located below the seat plate and attached to the adjustable cross-bar.

24. A seat support assembly according to claim 17, wherein the mounting bracket includes a first mounting aperture and a plurality of second mounting apertures, the first mounting aperture being spaced apart from the plurality of second mounting apertures, and wherein the mounting bracket is attached to the side channel in the beam with a first fastener extending through the first mounting aperture and into the side channel and a second fastener extending through one of the second mounting apertures and into the side channel.

25. A seat support assembly according to claim 24, wherein each mounting bracket includes a housing which receives a lower end of one of the vertical supports.

26. A seat support assembly according to claim 25, wherein each vertical support includes a channel formed in and extending along at least a portion of the length of the support; and wherein the back frame cross-bar is attached to the vertical supports by a fastener that engages with a locking element located within the channel.

27. A seat support assembly comprising a seat bottom frame including at least two spaced apart beams, each beam including at least two channels extending alone at least a portion of the beam, one channel positioned on a bottom portion of the beam and the other positioned on an outwardly facing side of the beam, and a seat plate mounted to and extending between the beams, a plurality of seat mounting shafts for attaching the seat bottom frame to a frame of a wheelchair, at least one seat mounting shaft adjustably attached to the bottom channel in each beam, and a seat back frame including two vertical supports, each support having an upper end and a lower end, at least one adjustable back frame cross-bar attached to and extending between the vertical supports, and a mounting bracket attached to the lower end of each support and attached to at least one of the channels in each of the beams, and a plurality of tie-downs, each tie down being secured to at least one channel on a bean, the tie-downs including a ring portion and a mounting portion.

28. A seat support assembly for a wheelchair comprising:

a seat bottom frame including at least two spaced apart beams, each beam including at least one channel that extends alone at least a portion of the beam, and a seat plate mounted to and extending between the beams; and a seat back frame including two vertical supports, each support having an upper end and a lower end, at least one back frame cross-bar attached to and extending between the vertical supports, and a mounting bracket attached to the lower end of each support and removably attached to one of the channels in each of the beams, and two seat mounting shafts are attached to a seat rail, the seat rail having a T-shaped portion that is adapted to slide within the bottom channel.

29. A seat support assembly according to claim 28, further comprising at least two releasable pins, each pin extending through a side channel in one of the beams and engaging with a hole formed in the seat rail for releasably attaching the beam to the set rail.

30. A seat support assembly comprising:

a seat bottom frame including at least two spaced apart beams, each beam including at least two channels extending alone at least a portion of the beam, one channel being positioned on a bottom of the beam and the other positioned on an outwardly facing side of the a seat plate mounted to and extending between the beams, a plurality of seat mounting shafts for attaching the seat bottom frame to a frame of a wheelchair, at least one seat mounting shaft being adjustably attached to the bottom channel in each beam, and a seat back frame including two vertical supports, each support having an upper end and a lower end, at least one adjustable back frame cross-bar attached to and extending between the vertical supports, and a mounting bracket attached to the lower end of each support and attached to at least one of the channels in each of the beams, and two seat mounting shafts are attached to a seat rail, the seat rail having a T-shaped portion that is adapted to slide within the bottom channel.

31. A seat support assembly according to claim 30, further comprising at least two releasable pins, each pin extending through a side channel in one of the beams and engaging with a hole formed in the seat rail for releasably attaching the beam to the set rail.

* * * * *